United States Patent [19]

Sapora

[11] 4,368,459

[45] Jan. 11, 1983

[54] EDUCATIONAL APPARATUS AND METHOD FOR CONTROL OF DEAF INDIVIDUALS IN A MIXED TEACHING ENVIRONMENT

[76] Inventor: Robert Sapora, 825 Holiday La., Westminster, Md. 21157

[21] Appl. No.: 217,081

[22] Filed: Dec. 16, 1980

[51] Int. Cl.³ .............................................. G08B 13/00
[52] U.S. Cl. ................................ 340/407; 179/2 EC; 434/112
[58] Field of Search .................... 340/407, 566, 148; 179/1 VC; 434/112, 114; 455/79, 66

[56] References Cited

U.S. PATENT DOCUMENTS

| | | | |
|---|---|---|---|
| 1,733,605 | 10/1929 | Jones | 434/112 |
| 3,286,031 | 11/1966 | Geddes | 179/1 VC |
| 3,463,885 | 8/1969 | Upton | 434/112 |
| 3,585,303 | 6/1971 | Chieffo | 179/1 |
| 3,623,064 | 11/1971 | Kagan | 340/407 |
| 3,629,521 | 12/1971 | Puharich et al. | 179/107 R |
| 3,742,359 | 6/1973 | Behymer | 325/26 |
| 3,766,331 | 10/1973 | Zink | 179/107 R |
| 3,786,628 | 1/1974 | Fossard et al. | 340/407 |
| 3,860,745 | 1/1975 | Takada | 178/5.6 |
| 3,875,337 | 4/1975 | Bradley | 179/1 VC |
| 3,875,932 | 4/1975 | Wachspress | 128/24 R |
| 3,914,800 | 10/1975 | Collins | 3/1 |
| 3,954,101 | 5/1976 | Wachspress | 128/24 R |
| 4,015,087 | 3/1977 | Stewart | 179/1 SP |
| 4,025,732 | 5/1977 | Traunmuller | 179/107 FD |
| 4,139,742 | 2/1979 | Walker | 179/107 BC |
| 4,225,965 | 9/1980 | Baugh | 340/407 |
| 4,296,277 | 10/1981 | Daneffel | 179/1 VC |
| 4,297,677 | 10/1981 | Lewis et al. | 340/407 |

FOREIGN PATENT DOCUMENTS 2044977 10/1980 United Kingdom ............... 434/112

OTHER PUBLICATIONS

Anon., "Public" Amplification by Loop Induction, Senior Digest, Oct. 1979, at p. 5.
Conover, D. W., "A Spectacle—Mounted Code Blinker", QST, Feb. 1978, pp. 25–27.

Primary Examiner—Gerald L. Brigance
Attorney, Agent, or Firm—Eugene F. Osborne, Sr.

[57] ABSTRACT

Radio signaling apparatus is for use, primarily, in classrooms at all educational levels, elementary school through graduate school, in which a teacher and a mixed body of hearing and deaf students participate in a lecture and discussion situation with the support of a trained interpreter in sign language. The radio system comprises a voice actuated pulsed omnidirectional radio transmitter, which is worn by the teacher, and a plurality of portable receiving devices, one for each deaf student. The microphone of the transmitter is selected to discriminate against ambient sounds and background voices. The omnidirectional receivers detect the pulsed radio transmissions and generate by transducer action a non-audible sensory stimulation to alert each individual deaf student, whereupon each such student should renew his or her observation of the interpreter. In a preferred embodiment the radio apparatus provides a flashing visual signal from each deaf student's receiver. The receiver and transducer are to be worn or placed within the student's peripheral field of vision when the student is working on or is reading his class notes and texts during classroom sessions. The system is adaptable to more general uses outside the classroom.

10 Claims, 3 Drawing Figures

EDUCATIONAL APPARATUS AND METHOD FOR CONTROL OF DEAF INDIVIDUALS IN A MIXED TEACHING ENVIRONMENT

BACKGROUND OF THE INVENTION

1. Field of the Invention

The invention is a radio signaling device primarily for use in the educational and training fields to improve the effectiveness of classroom instruction by providing a means for coordinating the deaf student's visual attention to the teacher's messages as presented by visual graphic aids or as presented by sign language interpretations of the teacher's speech. The invention has applications in other fields including communications, telephony, signals, warning systems, displays and radio. A common objective is to gain the attention of the deaf individual for purposes of receiving new instructions or for alerting the deaf to changing situations or developing dangers. Examples of applications outside the classroom include:

- supervisory control in industry
- "door bell" annunciator for residences
- smoke, fire, and general alarms
- trained "hearing ear" dog support
- obstructed view warning systems for moving equipment, construction equipment in reverse as an example

2. Description of Prior Art

The requirements of the present invention for electronic components, circuits, and radio devices are totally satisfied by well-known and well-developed arts of manufacture in the electronic and radio industries. Furthermore, it is also evident in the existing arts that the loss, by a human, of a sensory capability, such as hearing, can be compensated, at least in part, by augmentation or expanded usage of one or more of the other human senses, i.e., sight, touch, taste and smell. In the case of complete loss of hearing, via the auditory organs, perception and information transfer to the handicapped individual is presently most frequently accomplished through visual or touch sensations.

However, in the field of education, specifically of the deaf, reliance upon visual aids including sign language interpretations presently results in deficiencies in information transfer from teacher to student. These deficiencies are of such magnitude as to seriously depreciate the learning process of the deaf. The deaf must, on occasion, look at other legitimate classroom objects and are likely to miss important portions of the instructions.

The following references in the existing arts are relevant to compensation for an impairment in hearing ability by augmentation and use of alternative sensory capabilities of the human body. These references do not, however, disclose or teach the present invention.

U.S. Pat. No. 4,139,742 Walker, February 1979

An apparatus for transmitting voice signals to a person via physical stimuli to cutaneous nerve receptors beneath the skin. A mechanical oscillating vibrator, driven by voice signals, is worn on the wrist.

U.S. Pat. No. 4,025,732 Traunmuller, May 1977

The electroacoustic signal from a microphone is band filtered and translated to a low frequency vibration to drive at least one tactile or auditive transducer.

U.S. Pat. No. 4,015,087 Stewart, March 1977

Apparatus for spectrographic analysis of speech and a video display thereof on a cathode ray oscilloscope is applicable to speech training of deaf students.

U.S. Pat. No. 3,954,101 Wachspress, May 1976

The apparatus contains an audiotactile stimulator for the application of sound waves to the skin of the life form for the communication of audio information to the brain without use of the ear.

U.S. Pat. No. 3,914,800 Collins, October 1975

The invention relates to the replacement of a lost sensory mode by the use of a fluid mechanical (jet) tactile oscilloscope for the discharge, in response to an input transducer, of a jet of water to a sensitive area of the skin.

U.S. Pat. No. 3,875,932 Wachspress, April 1975 (Also U.S. Pat. No. 3,954,101 above)

Apparatus for bypassing the ear by application of low frequency high pressure sound waves to the skin for the communication of information.

U.S. Pat. No. 3,860,745 Takada, January 1975

Television and information selector apparatus for programmed learning and teaching applications, video to video.

U.S. Pat. No. 3,766,331 Zink, October 1973

Electrical means for conveying information to the brain of deaf persons, bypassing the auditory track of the ear, by application of electrical pulses to electrodes mounted to the person's neck.

U.S. Pat. No. 3,742,359 Behymer, June 1973

Radio apparatus for classroom applications in teaching the hard-of-hearing, as distinguished from the totally deaf, comprising a transmitter and a receiver with inductive coupling to the student's hearing aid for isolating extraneous sounds and enhancing the instructor's speech.

U.S. Pat. No. 3,629,521 Puharich and Lawrence, December 1971

A dual stimulation system for persons with impaired hearing comprising an audio "in the ear" hearing aid supplemented by a separate transdermal RF electrical signal transducer for coupling of information through the facial nerve system.

U.S. Pat. No. 3,585,303 Chieffo, June 1971

A telephone system for the deaf which uses a flashing lamp for display of voiced information to be received by the deaf person and a telegraph keying switch for sending information in conventional or prearranged special codes.

Senior Digest, "Public Amplification by Loop Induction," October 1979

A public address system for use in auditoriums is coupled via an induction loop to hearing aids equipped with a telephone switch to eliminate distracting background noises.

Conover, D. W., "A Spectacle-Mounted Code Blinker", QST February 78 pp 25-27.

A LED is mounted to an outrigger boom attached to a person's spectacles for use in the practice of code by the deaf by means of the flashing visual display.

SUMMARY OF THE INVENTION

The efficiency of perception of the human hearing sense is relatively insensitive to directional angles as between the acoustical source and the orientation of the person's head. However, for the deaf person who must rely on visual observations for communications and information transfers the directivity in observation and perception is exceedingly important. Complete failure prevails unless the source of information is maintained within at least the peripheral field of view of awake and conscious deaf individuals. But in many instances the deaf individual is required to look in directions exclusive of a particular information source. Without some external aid the deaf individual does not know when it is timely that his or her field of vision be reoriented to include again the particular information source. Otherwise the deaf individual is unaware that certain events may have transpired, a situation may have changed, or new information may have been given.

Therefore it is an object of this invention to provide signaling apparatus for coordinating deaf individuals whereby they may be alerted in timely fashion to changing situations that require their renewed or special attention.

Another object of the present invention is to provide signaling apparatus for coordinating deaf individuals that preserves, to the maximum extent possible, freedom of movement for the deaf individual.

It is a further object of the present invention to provide signaling apparatus for coordinating deaf students in a clsssroom environment so that they may conform their activities to the progress of an ongoing lecture to achieve an improvement in information transfer and learning.

It is a still further object of the present invention to provide signaling apparatus for coordinating deaf students in a classroom environment, the apparatus to be automatically responsive to renewed speech of the teacher or lecturer.

Additional objectives will become apparent from the descriptions.

To accomplish the stated objectives the present invention uses principles of radio communications. The apparatus comprises a low-power keyed portable transmitter, operating at a fixed frequency channel and having at least a mode automatically responsive to the wearer's voice, and a multiplicity of small portable receiving sets, one for each deaf individual to be served. Each receiver will have one or more output transducers responsive to the keyed radio transmissions. The transducers will convert the detected electrical signal to visual or touch stimuli so that the receiver display or output may be worn or located in a position to alert the deaf person.

BRIEF DESCRIPTION OF THE DRAWINGS

Further details of the present invention are described below with the aid of the illustrations in the attached drawings in which.

DESCRIPTION

Figure 1:
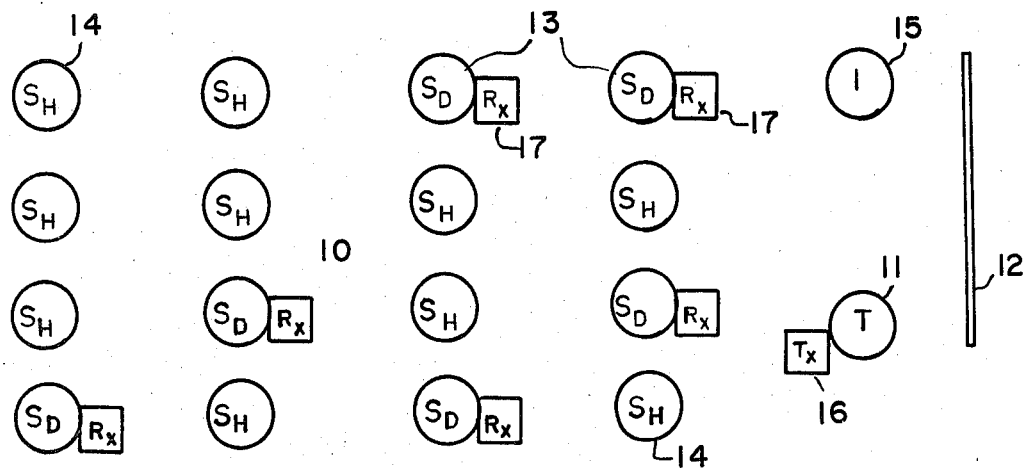
FIG. 1 is a floor plan of a typical classroom situation representing a mixed body containing at least some deaf individuals as students.

Referring initially to FIG. 1, the composition of the student body 10 in a classroom frequently contains one or more persons whose hearing capability is impaired to the extent that they are unable to comprehend the spoken words of the teacher 11 but must rely upon lip reading or sign language. In the typical classroom, lecture hall or auditorium, lip reading is generally inadequate because of distances involved and because the teacher 11 must on occasions face the blackboard 12, look at his own notes or look away from the student body while speaking. Therefore in a mixed student body 10, comprised of deaf students 13, designated by the symbol $S_D$, and hearing students 14, designated by the symbol $S_H$, a trained interpreter 15 may be employed to translate the spoken language of the teacher 11 to sign language, within limits of the available symbols, for communicating the teacher's words to the deaf students 13. The interpreter 15 must locate at the front of the room near the teacher 11 and the blackboard 12 and face the student body 10.

Given the classroom situation as described, serious problems in coordination remain for the deaf students 13 which lead to their frustration and failure in the instruction. To illustrate, the deaf students 13 look toward the interpreter 15 to receive in sign language what the teacher 11 is saying to the class 10. The teacher 11 may say something like "Now look closely at paragraph number three on page forty of the text and find three examples of the correct use of the semicolon." At this point, both hearing 14 and deaf 13 students will shift their eyes from the front of the room to the books open in front of them on their desks the deaf students 13 responding to sign language symbols of the interpreter 15, representing the information content of the spoken command of the teacher 11. It is important to recognize that, while the students are scrutinizing the paragraph, not even their peripheral vision, nor their more accurate central vision includes in its range the teacher 11 and the interpreter 15. After a few moments of silence the teacher 11 may then say "Alright, who can point out the first correct use of the semicolon in that paragraph?" All the hearing students 14 hear the question, look up, and decide whether they can answer. But the deaf students 13, who have no way of knowing that the teacher 11 has asked a question, may continue scrutinizing the text long after it is appropriate for them to look to the front of the room and renew watching the interpreter 15 for the next statement of the teacher 11. In the described situation, since the deaf students 13 are not then looking at the interpreter 15 but are doing something required by the teacher 11 nonetheless, the presence and action of the interpreter 15 in the classroom fails to maintain communications and the deaf students 13 realize, often with understandable frustration, that they are missing important messages from the teacher 11.

The radio signaling system for coordinating deaf individuals is comprised of two types of electronic assemblies; the first being a short range radio transmitter 16, designated by the symbol Tx, the second being a small personal radio receiver and non-acoustic sensory transducer 17, designated by the symbol Rx, with each deaf student 13 to be assigned a receiver for personal use. In the preferred embodiment for classroom use the transducer will provide a visual display.

The radio communications shall have omnidirectional characteristics and be effective for distances of the order of 50 to 150 feet. All of the circuits and component parts of both transmitter 16 and receiver 17 assemblies are items available in the electronic industries or are susceptible to manufacture from known designs available to practitioners of the radio arts.

Figure 2:
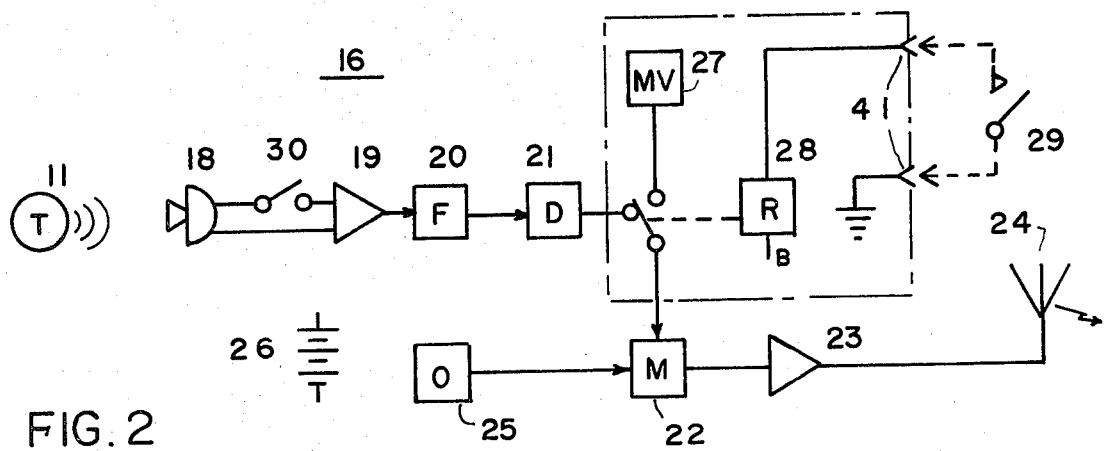
FIG. 2 is a basic block diagram of a teacher's radio transmitter for classroom instruction of the deaf.

In a preferred embodiment of the invention, as intended for use in training and classroom situations, the transmitter assembly 16 is small, portable, and adapted to be worn by the teacher 11. The transmitter 16 shall be sensitive to the audible speech of the teacher 11. As illustrated in FIG. 2 the transmitter 16 will include a microphone 18, an audio amplifier 19, a selective filter 20 that passes energy at voice frequencies and discriminates against ambient noises, a voice level threshold detector 21, a bistate modulator 22, a radio frequency generator or local oscillator 25, a RF output amplifier 23, an omnidirectional antenna 24, and battery power supply 26.

Optional additional circuits for the transmitter assembly 16 include a microphone switch 30, a uniform keying rate generator 27, typically a multivibrator operating in the range of 1 to 25 pulses per second, a switching relay 28, shown functionally in FIG. 2, and a connector receptacle 41 which allows operation of the relay 28 through an external switching means 29. The teacher may use the external switch 29 for special effects. Control of the transmitter 16 through an external switch 29 expands the utility of the apparatus to a variety of applications outside the classroom in special and general alarm, warning and control situations.

The microphone 18 should be selected for its directivity to the teacher's speech and reduced sensitivity to other directions of the classroom. The throat microphone is typical of the acceptable types. The transmitter 16 is a low power device that emits electromagnetic energy in an authorized channel of the radio frequency spectrum.

Figure 3:
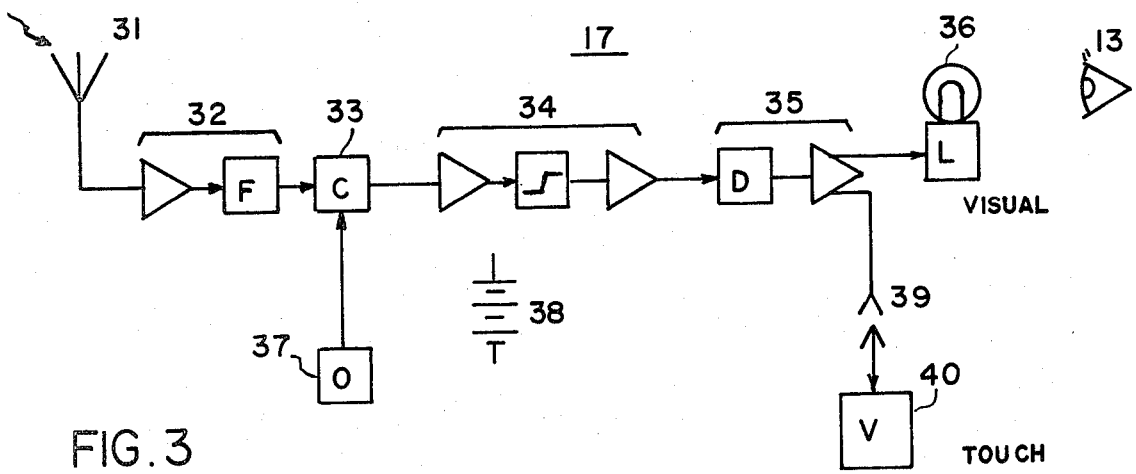
FIG. 3 is a block diagram of a deaf student's radio signaling receiver.

The elements of the personal receiving set 17 for the preferred embodiment of the invention are illustrated in FIG. 3. The set 17 comprises circuits and components well-known in the radio and electronic arts including, typically, an omnidirectional receiving antenna 31, an input amplifier and selective bandpass filter 32, tuned to the assigned and authorized RF channel, a frequency converter 33, a local reference frequency oscillator 37, a limiting amplifier 34 to provide a stabilized signal level for detection, a demodulating detector and output amplifier 35, a transducer 36 to provide a visual display, a battery power supply 38, and an audio output connector receptacle 39 to allow connection of the receiver electrical control signal to an external transducer 40. While the incorporated internal transducer 36 can be a lamp or preferably an LED to provide a visual display of the electrical control signal the preferred alternate external transducer 40 should provide a touch stimulus to the body of the person. At the option of the user, the external transducer 40 may be selected from the touch stimulating types that function by application of vibrating mechanical forces or pressures or by application of electrical impulses to sensitive areas of the skin or body. The touch stimulating transducer 40 is deemed essential for those situations wherein the user is asleep or wherein the activity of the user does not permit the receiving set 17 to be within the user's peripheral field of vision.

Returning to the classroom application, each deaf student 13 places a receiving set 17 near his or her text or notebook, typically on the desk, but always well within the range of peripheral vision. The display 36 will flash a series of bright colored visual signals whenever the teacher 11 speaks and will therefore provide a command signal, missing in ordinary classrooms, that the deaf student 13 needs in order to know when to look up from the book and desk and again pay attention to the sign language of the interpreter 15 representing the continued speech of the teacher 11. The deaf student is thereby enabled to coordinate his or her response activity to the teacher's complete lecture as relayed through the interpreter 15.

While the preferred embodiments of the present invention have been described, it should be understood that variations, adaptations, and modifications may be made therein without departing from the invention and scope of the appended claims.

I claim:

1. A method of coordinating, in a teaching environment, the activities of a mixed audience of deaf and hearing students to aid said deaf students in following a teacher's instructions and discussions, as translated to sign language for the deaf by an attending trained interpreter, for the purpose of achieving improved information transfer and enhanced learning opportunities, wherein the improvement comprises the steps:
   a. isolating the speech of said teacher, by a first transducer having directive sensitivity so arranged as to receive said teacher's speech and to discriminate against ambient sound and audience sources of speech;
   b. converting, by said first transducer and a signal processor means, acoustical energy of said teacher's speech pattern to a bistate electrical signal, said electrical signal having a first state representing a silent interval of said teacher and a second state representing a speech interval of said teacher;
   c. distributing, by a broadcast communications system responsive to said bistate electrical signal, a coordinating signal to a multiplicity of personal receiving sets, one such personal receiving set kept in the actual presence and within the peripheral field of view of each individual person in the population of said deaf students;
   d. converting said coordinating signal as received to silent sensory phenomena, by a second transducer and signal processor means located in each personal receiving set kept in the actual presence of each said deaf student, said phenomena having a first state representing said teacher's silence and a second state representing said teacher's audible speech;
   e. displaying said silent phenomena to sensory receptors of the body of each said deaf student, said receptors sensitive to said phenomena in controlling the consciousness of said deaf student to the changing pattern of said teacher's intervals of silence and audible speech, thereby providing timely commands to said deaf student of each need to observe said sign language of said interpreter so as to follow said teacher's entire lecture.

2. The method as defined by claim 1, wherein said first transducer and said signal processor comprise a discriminating microphone worn by said teacher, a bandpass amplifier and filter having sensitivity to voice frequencies, and a threshold level detector, all operative in concert to distinguish between silence and audible speech emanating from said teacher, said discriminating microphone for attenuating ambient sounds and audience sources of speech to levels below the sensitivity of said threshold level detector.

3. The method as defined in claim 1, wherein said broadcast communications means comprises a low power localized radio system operative in an assigned fixed frequency channel of the electromagnetic spectrum.

4. The method as defined by claim 1, wherein said second transducer and signal processor means for each said personal receiving set further comprises a visual display, responsive to said coordinating signal, said visual display having a first state of darkness representing said teacher's silence and a second state of illumination representing said teacher's audible speech.

5. A combination of educational apparatus to be used in a lecture environment for commanding one or more deaf individuals, comprising a portion of an audience, to observe timely sign language interpretations of instructive discourses, there being a trained interpreter in attendance for translating the information of a teacher's speech into sign language, said combination comprising:
 a. a radio transmitter assembly for radiating coordinating signals into a surrounding localized area, the control of said transmitter and said coordinating signals being retained by said teacher;
 b. a means for switching the radiant emissions of said transmitter between two discrete states, said states representing to said deaf individuals a first condition granting said deaf individuals freedom in directing their personal fields of view, and a second condition commanding said deaf individuals to direct their personal fields of view so as to visually observe said interpreter in attendance for receiving said sign language interpretation of instructive discourses;
 c. a multiplicity of radio receivers, one assigned to and retained in the actual presence of each said deaf individual, each said receiver responsive to said emissions of said radio transmitter in producing a bistate electrical control signal representing said first condition granting said deaf individual freedom in directing his field of view and said second condition commanding said deaf individual to direct his field of view so as to observe said trained interpreter, in attendance;
 d. a means for converting said electrical control signal into silent stimuli, in each said radio receiver, said stimuli having a first state representing said first condition granting freedom of view and a second state representing said second condition commanding observation of said trained interpreter, said stimuli having characteristics and properties distinguishable by silent sensory receptors of the human body; and
 e. means for applying said silent stimuli to sensory receptors of each said deaf individual of said audience, said receptors sensitive to said stimuli to establish consciousness for each said deaf individual of the progression of said instructive discourses, indicating specifically each interval when said deaf individual is commanded to observe the visual symbols of said attending sign language interpreter.

6. A combination of educational apparatus as recited in claim 5, wherein said means of switching the emissions of said radio transmitter assembly further comprises:
 f. a space discriminating microphone for the generation of electrical signals, the directivity of said microphone arranged to be responsive to the speech of said teacher and to effectively attenuate ambient sounds and audience sources of speech;
 g. an amplifier of said microphone electrical signals;
 h. an electrical filter circuit responsive to frequency components of said microphone signal representative of voice;
 i. a threshold detector operative on said filtered microphone signal, said threshold detector having a two state electrical output, a first state indicative of said teacher's silence and a second state responsive to said teacher's speaking;
 j. a switching circuit responsive to external control from a location off-board said transmitter assembly, said switching circuit providing means for selecting said threshold detector two state electrical output;
 k. a two state modulator for said radio transmitter emissions, said modulator responsive to a signal applied by said switching circuit, said modulator providing, on selection of said threshold detector output, radio emissions at a first state of modulation representing said teacher's silence and radio emissions at a second state of modulation representing said teacher's speech.

7. A combination of educational apparatus as recited in claim 5, wherein said means for converting said electrical control signal into silent stimuli, in each said radio receiver, further comprises a transducer, responsive to said electrical control signal, for producing phenomena that are perceivable by human sensory receptors for touch.

8. A combination of educational apparatus as recited in claim 5, wherein said means for converting said electrical control signal into silent stimuli, in each said radio receiver, further comprises a transducer, responsive to said electrical control signal, for producing phenomena that are perceivable by human sensory receptors for sight.

9. A combination of educational apparatus as recited in claim 5, wherein said means for applying said silent stimuli to sensory receptors of each said deaf individual of said audience, comprises:
 m. a visual display of fluctuating illumination, responsive to said electrical control signal, said display incorporated within said radio receiver assembly, said receiver and display locatable within the peripheral field of vision of said deaf individual; and
 n. a connector receptacle incorporated within said radio receiver assembly, said receptacle conveying said electrical control signal to interface with an external assembly, said external assembly further comprising a transducer, responsive to said electrical control signal, for producing tactile stimuli, and means for contact coupling of said tactile stimuli to tactile receptors of said deaf individual.

10. A combination of educational apparatus for use by a teacher in special situations, for commanding an action by one or more deaf individuals, in attendance, during the period of a lecture, said action specifically defined by a prior instruction to said deaf individuals, wherein the improvement comprises:

a. a radio transmitter assembly, responsive to said teacher's control, for radiating coordinating signals throughout a localized area enclosing an entire audience, said transmitter assembly further comprising:
   a uniform keying signal generator for providing an alternating binary output waveform in an operating range of 1 to 25 pulses per second,
   a switching circuit for selection of said binary keying signal, the control element of said switching circuit remotely accessible via a connector interface, and
   a circuit for modulating the emissions of said radio transmitter, for radiating said coordinating signals in two modulation states, a first modulation state representing a grant by said teacher of free action to said deaf individuals, and a second modulation state representing a command by said teacher to said deaf individuals that each said deaf individual now respond according to said defined prior instruction;
b. a remote activating means for controlling said switching circuit, thereby selecting the output waveform of said uniform keying signal generator for modulation of said transmitter emissions;
c. a multiplicity of radio receiver assemblies, one for assignment and retention in the actual possession of each said deaf individual in said audience, for receiving said teacher's control commands, each said receiver assembly further comprising:
   a means for demodulating the received emissions of said transmitter to produce an electrical control signal responsive to said two modulation states,
   a connector for interfacing said electrical control signal to an off-board remote location,
   a means of converting said electrical control signal to silent phenomena for visual display to said deaf individual, said receiver and visual display adapted for positioning within the peripheral field of view of said deaf individual, said phenomena for visual display responsive to said said modulation in two states, darkness representing to said deaf individual said grant of free action and fluctuating illumination in said operating range of 1 to 25 pulses per second representing, to said deaf individual, receipt of said teacher's command to take timely action in accordance with said defined prior instruction; and
d. a multiplicity of external assemblies, each external assembly connectable and operable in conjunction with a personal receiving set, being connectable via said connector for interfacing said electrical control signal, each said external assembly further comprising:
   a transducer for converting said electrical control signal into tactile stimuli, responsive to said coordinating signals, representing said grant of free action and said command to take timely action in accordance with said defined prior instruction by said teacher, and
   a means of direct coupling of said tactile stimuli to touch sensory receptors of said deaf individual for control by said teacher in said special situations, said teacher selecting said output waveform of said uniform keying signal generator for modulation of said transmitter emissions.

* * * * *